United States Patent
Lacout

(10) Patent No.: US 6,601,739 B2
(45) Date of Patent: Aug. 5, 2003

(54) RETENTION ELEMENT, DISPENSING DEVICE, AND METHOD OF USE

(75) Inventor: Frank Lacout, Draveil (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 09/902,592

(22) Filed: Jul. 12, 2001

(65) Prior Publication Data

US 2002/0027144 A1 Mar. 7, 2002

(30) Foreign Application Priority Data

Jul. 12, 2000 (FR) ............................. 00 09109

(51) Int. Cl.⁷ ............................................. G01F 11/42
(52) U.S. Cl. ............................... 222/321.5; 222/321.9; 222/377; 222/464.7
(58) Field of Search ...................... 222/320, 321.1, 222/321.5, 321.7, 321.9, 328, 372, 377, 454, 456, 464.7, 376, 402.18, 321.4

(56) References Cited

U.S. PATENT DOCUMENTS

| | | | |
|---|---|---|---|
| 1,896,405 A | | 2/1933 | Hauser |
| 3,379,136 A | * | 4/1968 | Corsette ................. 222/321.4 |
| 4,776,498 A | * | 10/1988 | Maerte et al. .......... 222/321.9 |
| 5,476,198 A | | 12/1995 | Jouillat et al. |
| 6,179,170 B1 | * | 1/2001 | Bachand ................. 222/321.4 |
| 6,431,408 B1 | * | 8/2002 | De Laforcade ......... 222/321.5 |

FOREIGN PATENT DOCUMENTS

| | | | |
|---|---|---|---|
| EP | 0 626 321 | 11/1994 | |
| FR | 2 393 279 | 12/1978 | |
| FR | 2817244 A1 | * 5/2002 | .......... A45D/34/00 |

OTHER PUBLICATIONS

Co-pending Application No. 09/992,429; Attorney Docket No. 05725.0997 *Dispensing Device and Methods,* Vincent De Laforcade, Nov. 26, 2001.

English language Derwent Abstract of FR 2 393 279, Dec. 29, 1978.

* cited by examiner

*Primary Examiner*—Kevin Shaver
*Assistant Examiner*—Stephanie Willatt
(74) *Attorney, Agent, or Firm*—Finnegan, Henderson, Farabow, Garrett & Dunner, LLP

(57) ABSTRACT

A device for packaging and metered dispensing of a product includes a container having an opening that receives a retention element defining a metering cavity. The device may be equipped with a pump for dispensing the contents of the metering cavity. The retention element may also include a first passage and a second passage, with the second passage located between the opening of the container and the first passage. The first and second passages are intended to be brought into communication with the product by at least partially inverting the container. Ribs may be provided within the retention element for channeling all or some of the product entering the retention element via the second passage towards the metering cavity.

83 Claims, 5 Drawing Sheets

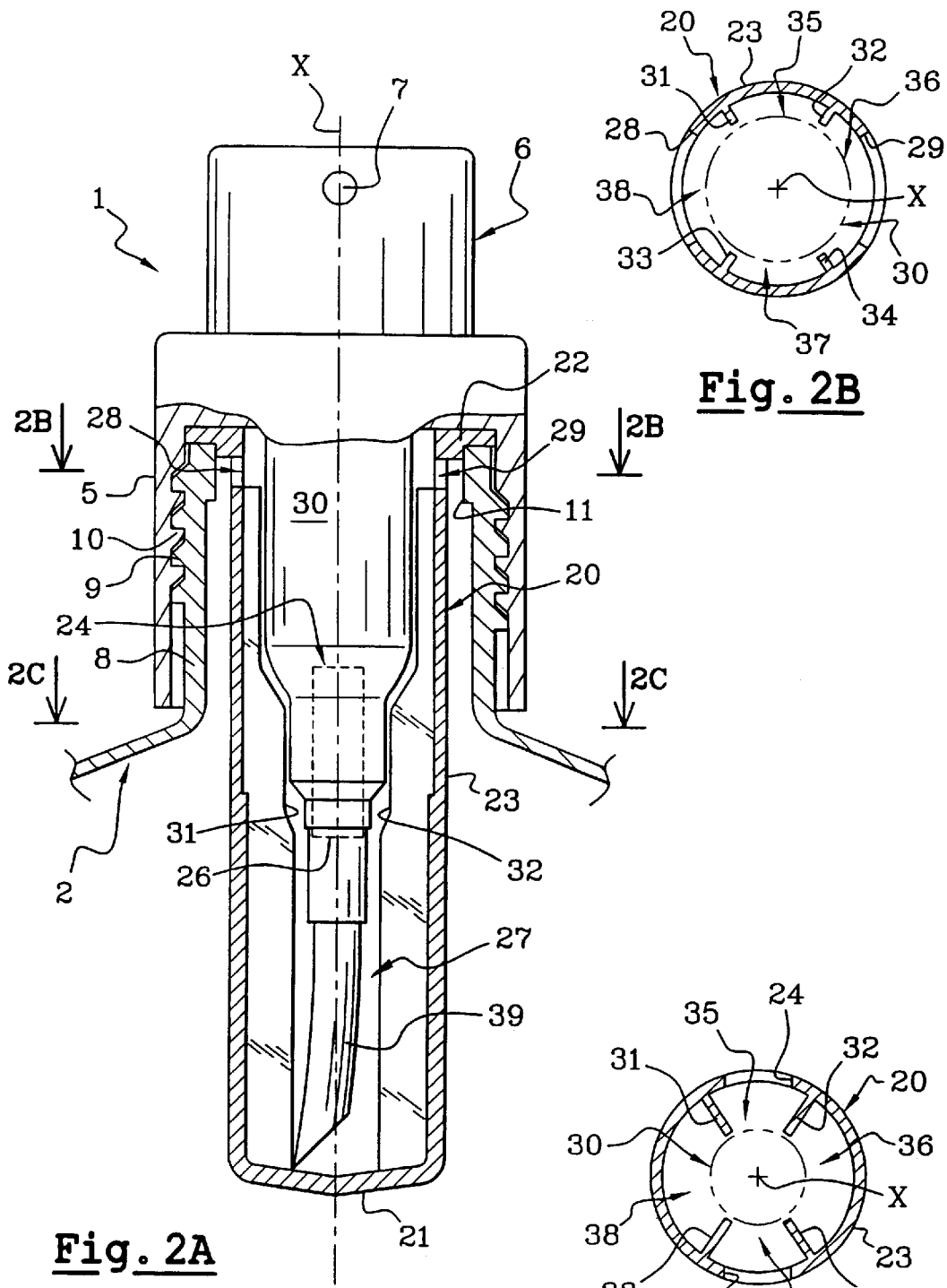

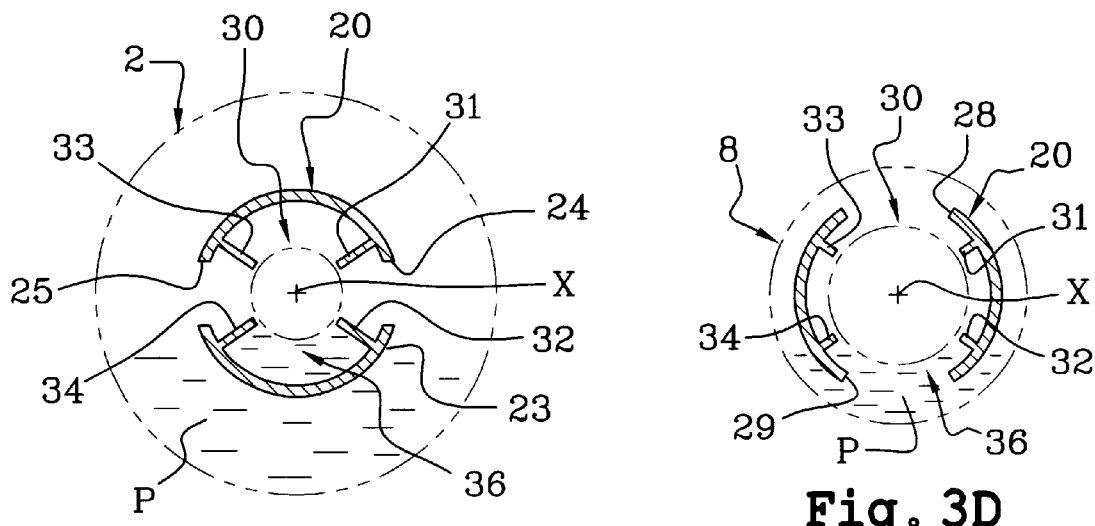
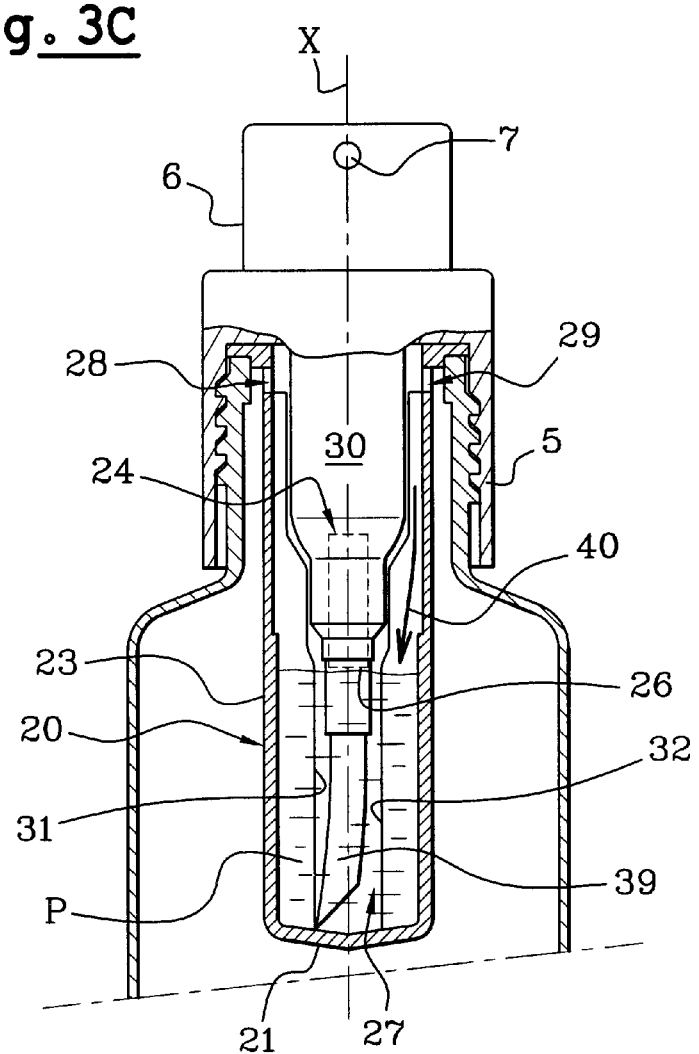
Fig. 3C
Fig. 3D
Fig. 3E

RETENTION ELEMENT, DISPENSING DEVICE, AND METHOD OF USE

The present invention relates to a retention element, a device including a retention element, and a method of using the retention element for metered dispensing of a product, for example, a cosmetic product, such as a make-up product or beauty care product. Such products may be used, for example, for making-up or for the care or hygiene of the skin or hair. Such metered dispensing may be desired, for example, such as in the case of products as used for the care or regrowth of hair.

The device forming the subject of the present invention may be of the type including a retention element defining a metering cavity, to be filled, such as, by inverting the device either completely or partially. The device may be equipped with a pump ensuring that the product contained in the metering cavity is dispensed. The product may be dispensed by means of the pump when the device is in the upright position, such as when the pump is located above the free surface of the liquid in the container that contains the product to be dispensed.

An example of a conventional device can be found in EP 0 626 321, which teaches a device equipped with a pump, without a dip-tube, and an element having an end wall and a side wall. The external diameter of the element is less than the internal diameter of the neck of the container. Furthermore, the element includes flexible tabs around the upper end of its side wall flaring out towards the neck of the container. The flexible tabs of the element flair out at an angle in order to ensure that the element is filled.

As a result of this configuration, it may be difficult to ensure that the element is properly filled, especially when the contents of the device are low since a large variation is observed in the degree of filling of the element, which depends on the manner in which the container is moved from a completely or partially inverted position to its upright, dispensing position.

An optional object of the present invention is to provide a device with a retention element for packaging and metered dispensing of a product that overcomes the drawbacks of the device described above.

Another optional object of the invention is to provide a device with a retention element that allows more consistent filling of the metering cavity even when the level of the product is low.

A further optional object of the invention is to provide a device having a retention element in which the degree to which the metering cavity is filled is independent of the movement of the assembly associated with the metering cavity.

Yet another optional object of the invention is to provide a device and retention element that are simple and reliable to use, and that are also inexpensive to produce.

The devices and methods of metered dispensing described herein may optionally solve some or all of the problems discussed above with reference to conventional packaging and metered dispensing devices and methods. It should be understood that the invention could be practiced without performing one or more of the optional objects and/or advantages described above. Certain other optional aspects of the invention will become apparent from the detailed description that follows.

According to a first optional aspect of the invention, a device for metered dispensing of a product comprises a container having an opening. The device may further comprise a retention element mounted at least partially within the container. The retention element may include a metering cavity configured to contain a product intended to be dispensed when the device is oriented in a substantially upright orientation. The retention element may also include at least one first passage located at an axial position defining a maximum volume of the metering cavity, and at least one second passage located at an axial position intermediate the opening of the container and the axial position of the first passage, such that the first and second passages are configured to be in flow communication with product when the device is at least partially in an inverted orientation. Additionally, the retention element may further include at least one channel configured such that when the device is moved from the at least partially inverted orientation to the substantially upright orientation, at least some of the product entering the retention element via the second passage is channeled toward the metering cavity. The device may also be provided with a pump configured to dispense product from the metering cavity.

Yet another optional aspect of the invention comprises a retention element for metering an amount of a product to be dispensed from a container. The retention element may optionally comprise a tubular member including an interior, an end wall, and an open end opposite the end wall as well as at least one first passage intermediate the end wall and the open end. In addition, a metering cavity may be defined between the end wall and the first passage. The tubular member may also include at least one second passage adjacent the open end. Additionally, the first and second passages may be configured to allow entry of a product into the interior of the tubular element via the second passage when the container is at least partially inverted, and further to allow metering of the product when the container is at least substantially uprighted resulting in a metered amount of the product being in the metering cavity while excess product is returned to the container by exiting the tubular member through the first passage.

Yet another optional aspect of the invention includes a retention element for metering an amount of a product to be dispensed from a container. The retention element may optionally include a tubular member having an interior, an end wall, and an open end. Additionally, the tubular member may include at least one first passage intermediate the end wall and the open end, a metering cavity defined between the end wall and the first passage, and at least one second passage adjacent the open end. Further, the retention element may include ribs configured to cooperate with the first and second passages to allow entry of the product into the interior of the tubular element when the container is at least partially inverted, and further to allow metering of the product when the container is at least substantially uprighted resulting in a metered amount of the product being in the metering cavity while excess product is returned to the container by exiting the tubular member through the first passage.

According to another optional aspect of the invention, the retention element may further include at least one longitudinal channel substantially closed at least along a distance defined between the second passage and the metering cavity.

In yet another optional aspect of the invention, the retention element may further include at least one rib at least partially defining a longitudinal channel such that an optional pump may cooperate with the rib to substantially close the longitudinal channel.

According to another optional aspect of the invention, the second passage may be located adjacent the opening of the container.

As an additional option, the retention element may comprise a generally tubular member having an end wall and an open end that may be located adjacent the opening of the container.

Optionally, the retention element may further include a first passage being optionally located at a first angular position, and a second passage located at a second angular position differing from the first angular position about a longitudinal axis of the retention element.

According to another optional aspect of the invention, the retention element may define two first passages located opposite each other and two second passages located opposite each other. The second passages may be offset ninety degrees with respect to the first passages.

According to another optional aspect of the invention, the retention element may further include at least one rib formed on an inner surface of the retention element and extending at least partially between the second passage and the metering cavity such that the rib defines a channel.

According to another optional aspect of the invention, the rib may extend to an end wall of the metering cavity.

As an additional optional aspect of the invention, the retention element may further include at least two ribs. The two ribs and the pump may optionally be configured to define a channel. The channel may be substantially closed at least between the second passage and the metering cavity such that the channel is in flow communication with the metering cavity.

As an optional aspect of the invention, the retention element may be substantially cylindrical and may comprise radially extending ribs.

According to yet another optional aspect of the invention, the pump may have a lengthwise profile. Optionally, the ribs may have a width that varies to substantially follow the lengthwise profile of the pump between the second passage and the metering cavity.

According to another optional aspect of the invention, the device may also include a dip-tube such that the dip-tube is attached to the pump resulting in one end of the dip-tube being located adjacent an end wall of the metering cavity.

According to yet another optional aspect of the invention, the container may include a neck defining an opening of the container such that at least a portion of the retention element extends within the neck.

According to another optional aspect of the invention, the neck of the container may optionally be provided with a collar attached to the neck such that the pump may be attached to the collar by one of snap-fastening and rotation.

According to an additional optional aspect of the invention, the pump may further include a push-button device for actuating the pump.

According to yet another optional aspect of the invention, the device may be provided with product contained in the container. For example, the product could be a cosmetic product or a hair growth product.

According to yet another optional aspect of the invention, the retention element may further include a collar adjacent the open end of the tubular member.

According to an additional optional aspect of the invention, the retention element may be provided with a collar extending outward from the tubular member for engagement with the container.

According to an additional optional aspect of the invention, the retention element may further comprise at least one rib configured to at least partially define at least one channel for delivering the product to the metering cavity from the second passage to the metering cavity.

According to another optional aspect of the invention, the rib may extend radially inward from an interior surface of the tubular member.

According to an additional optional aspect of the invention, the rib may be configured to cooperate with a dip-tube to define at least one substantially closed channel for delivering the product to the metering cavity.

According to another optional aspect of the invention the rib may have a width dimension that varies as the rib extends toward the end wall.

According to yet another optional aspect of the invention, the at least one rib may comprise four ribs defining four channels.

According to another additional aspect of the invention, the at least one first passage may comprise two passages.

In yet another optional aspect of the invention, the at least one second passage may comprise two passages.

As an additional optional aspect of the invention, the first passages may be located opposite each other, and the second passages may be located opposite each other such that the second passages are offset ninety degrees with respect to the first passages.

In another optional aspect of the invention, the first passage may be located at a first angular position, and the second passage may be located at a second angular position differing from the first angular position about a longitudinal axis of the retention element.

In another optional aspect, the invention includes a method of dispensing wherein the device is provided. For example, when the product is a cosmetic product, the method involves applying the product to skin and/or hair; and when the product is a hair growth product, the method includes applying the product to hair.

Aside from the structural and procedural arrangements set forth above, the invention could include a number of other arrangements, such as those explained hereinafter. It is to be understood that both the foregoing description and the following description are exemplary.

The accompanying drawings are incorporated in and constitute a part of this specification. The drawings illustrate optional embodiments of the invention and, together with the description, serve to explain some principles of the invention. In the drawings, FIG. 1 is an overall view of an optional embodiment of a device according to an optional aspect of the invention;

FIG. 2A is a partial cross-sectional view of a portion of the device of FIG. 1;

FIG. 2B is section 2B—2B of the device of FIG. 2A;

FIG. 2C is section 2C—2C of the device of FIG. 2A;

FIG. 3C is section 3C—3C of the device of FIG. 3B;

FIG. 3D is section 3D—3D of the device of FIG. 3B; and

FIG. 3E is a view of the device of FIG. 3A returned to a substantially vertical orientation.

Figure 1:
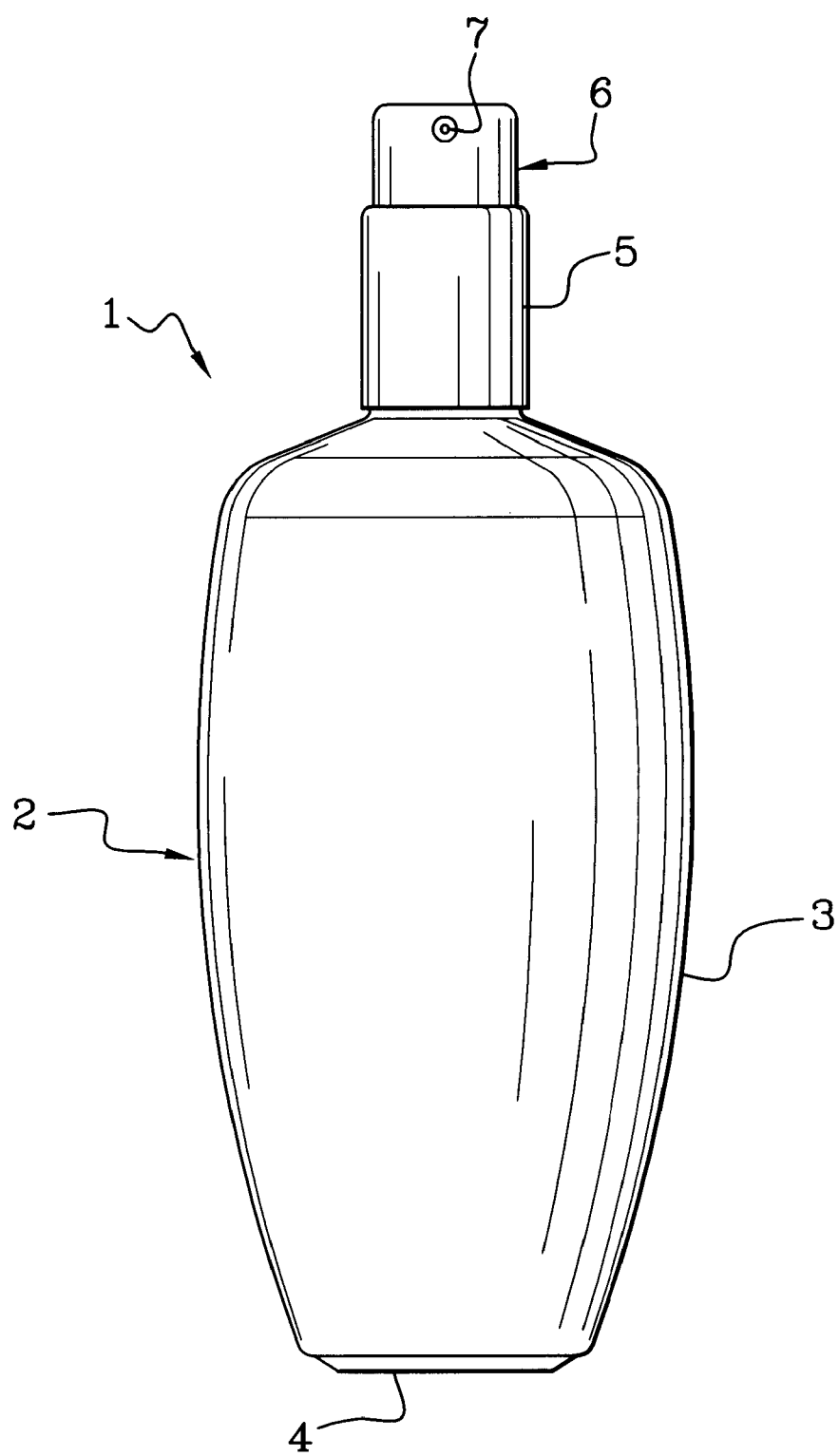
Figure 2D:
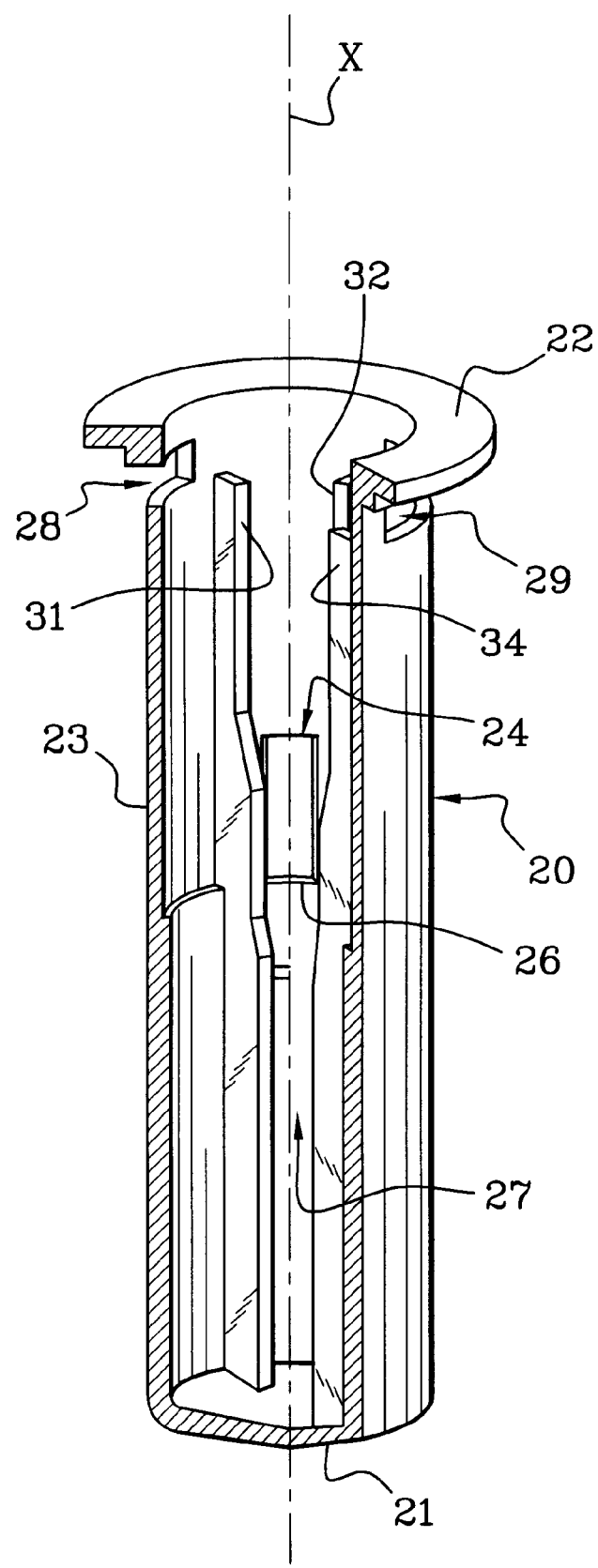
FIG. 2D is a perspective view of a partial cross-section of an optional embodiment of a retention element for the device.

The device for packaging and metered dispensing 1 shown in FIG. 1 comprises a container 2 having a body 3, one end of which may be optionally closed by an end wall 4. Opposite the end wall 4, the container may have a neck 8, a free edge of which defines an opening 11 in which a pump 30 fed from a retention element 20 may be mounted. The pump 30 may optionally be attached to the container 2 via a fitting collar 5. An actuating member in the form of a push-button 6 may be present to allow the pump 4 to be actuated, expelling the product P through at least one outlet orifice 7. The constituents of the device, for example, the container 2, the pump 30, the retention element 20, the collar 5 and the push-button 6, may be formed by moulding a thermoplastic, for example, such as a polypropylene or a polyethylene, although alternative materials are contemplated.

FIGS. 2A–2D, to which reference will now be made, illustrate in greater detail an optional embodiment of the retention element and its associated optional dispensing system.

One end of the container 2 may terminate in a neck 8. The outer surface of the neck 8 may include a screw thread 9 capable of engaging with a screw thread 10 provided on the inner surface of a fitting collar 5. The neck 8 of the container defines an opening 11 inside which a retention element 20 may be mounted. The retention element 20, as shown in the perspective view in FIG. 2D, may be in the form of a cylindrical element having an external diameter slightly less than the internal diameter of the neck 8 of the container 2. One end of the retention element 20 may be closed by an end wall 21. The other end of the retention element 20 may be open and have a rim 22 bearing on the free edge of the neck 8 of the container 2.

Two diametrically opposed first passages in the form of windows 24, 25 may be provided in the side wall 23 of the retention element 20 at, for example, approximately midheight. The windows 24 and 25 may be of oblong shape and may be oriented longitudinally to an axis X of the device 1. The lower edge 26 of the windows 24 and 25 defines the maximum filling height of the metering cavity 27 formed beneath the windows 24, 25. Optionally, the volume of the metering cavity 27 is of the order of a few milliliters, for example.

Approximately level with the opening 11 of the container 2, the retention element may form two second passages in the form of diametrically opposed windows 28, 29, for example, which may be offset by 90 degrees with respect to the windows 24 and 25. The windows 28 and 29 may be of oblong shape and may also be oriented perpendicular to the axis X of the device 1.

A pump 30, fastened to the collar 5, may be placed inside the retention element 20. The body of the pump 30 may have a profile that narrows in successive stages towards the end wall 21 of the metering cavity 27. The pump is optionally connected to a dip-tube 39, a free end of which may lie in the vicinity of the end wall 21 of the metering cavity 27.

Optionally arranged inside the retention element are channel structures that may be formed by four ribs 31–34 extending axially, approximately from the windows 28, 29, as far as the end wall 21 of the metering cavity 27, for example. The ribs 31–34 may be oriented radially and have a radial width that may increase in stages towards the end wall 21 so that the free end of the fins comes almost into contact with the body of the pump, at least over the height between the windows 28 and 29 and the windows 24, 25. Thus, four channels 35–38 may be formed by the cooperation between the ribs 31–34 and the body of the pump 30. These channels may optionally be largely closed over their length between the windows 28, 29 and the windows 24, 25, with which the channels 35–38 communicate at least in pairs, for example. It is also contemplated that numerous optional alternative structural configurations may form the channels. For example, such structures could include, but not be limited to, ribs or grooves on an outer surface of the pump, ribs or grooves on a surface of the dip-tube, and/or grooves on an inside surface of the retention element.

FIGS. 3A–3E, to which reference will now be made, illustrate various optional steps of the operation of the device previously described with reference to FIGS. 1 and 2A–2D.

Figure 3A:
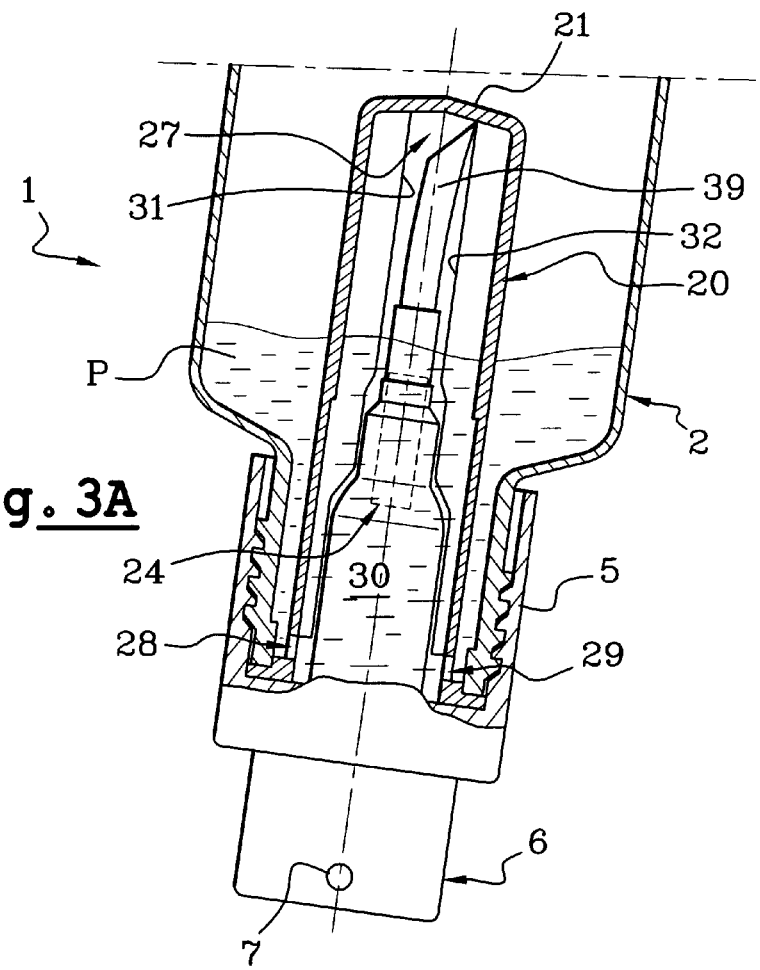
FIG. 3A is a partial cross-sectional view of the device of FIG. 1 in a substantially inverted orientation.

In the optional embodiment of FIG. 3A, the device 1 is inverted so that a first amount of the product P communicates with the retention element 20, both via the passages 28 and 29, and the passages 24 and 25.

Figure 3B:
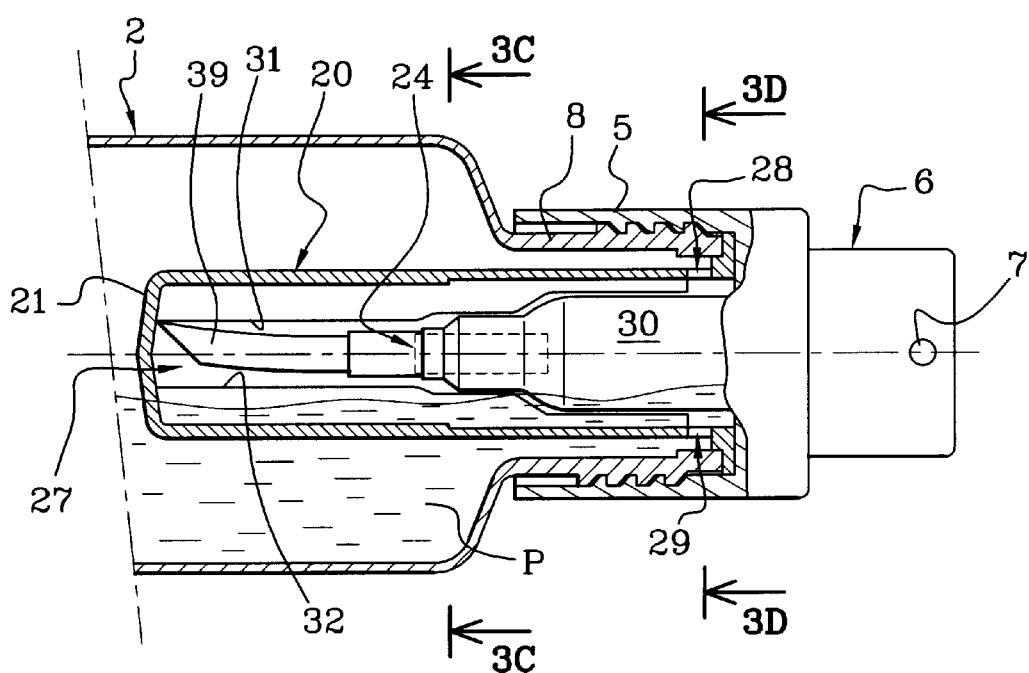
FIG. 3B is view of the device of FIG. 3A in a substantially horizontal orientation.

In FIG. 3B, the optional embodiment of device 1 has passed into a horizontal position, approximately halfway between the inverted position in FIG. 3A and the upright position of FIG 3E. The level of the product P may be approximately halfway up the neck 8 of the container 2. In this position, the first amount of the product P fills at least the channel 36 defined by the ribs 32 and 34 (see the sectional views of FIGS. 3C and 3D).

By continuing the movement of the device 1 to a position shown in FIG. 3E, for example, to bring the device substantially into an upright position, a second amount of the product P substantially fills the metering cavity 27. The filling of the metering cavity 27 is completed by the flow into the metering cavity 27 of a portion of the product P trapped, for example, in the channel 36 defined by the ribs 32 and 34 by the body of the pump 30. The flow of product P is designated approximately by arrow 40. The excess product P in the metering cavity 27 may return to the container 2 via the passages 24 and 25, while the second amount of the product P remains in the metering cavity 27. The metering cavity 27 may always be filled substantially in the same way, regardless of the manner in which the container 2 is alternately inverted and returned to the upright position.

Finally, all that remains is to dispense the contents of the metering cavity 27 by optional means of the pump 30, for example, which may be actuated by the push-button 6, resulting in the product passing into the pump 30 via the optional dip-tube 39 whose free end may be at the bottom of the metering cavity 27.

Preferably, the products according to the optional aspects of the invention are cosmetic, dermatological, or pharmaceutical compositions used for treating the hair, skin, or the nails. However, in its broadest aspects, the present invention could be used to package and dispense many other types of substances. For example, the dispenser may be used to dispense a variety of products, such as cleaning solutions, polishes, clothing dyes, or the like.

Furthermore, sizes of various structural parts and materials used to make these parts are illustrative and exemplary only and one of ordinary skill in the art would recognize that these sizes and materials can be changed as necessary to produce different effects or desired characteristics of the retention element or the device for packaging and metered dispensing of a product.

It will be apparent to those skilled in the art that various modifications and variations can be made to the structure and methodology of the present invention. Thus, it should be understood that the invention is not limited to the examples discussed in the specification. Rather, the present invention is intended to cover modifications and variations.

What is claimed is:

1. A device for metered dispensing of a product, the device comprising:

a container having an opening;

a retention element mounted at least partially within the container, the retention element comprising:

a metering cavity configured to contain a product intended to be dispensed when the device is oriented in a substantially upright orientation, at least one first passage located at an axial position defining a maximum volume of the metering cavity, and at least one second passage located at an axial position intermediate the opening of the container and the axial position of the first passage, wherein the first and second passages are configured to be in flow communication with product when the device is at least partially in an inverted orientation;
at least one channel configured such that when the device is moved from the at least partially inverted orientation to the substantially upright orientation, at least some of the product entering the retention element via the second passage is channeled toward the metering cavity; and
a pump configured to dispense product from the metering cavity.

2. The device of claim 1, wherein the channel comprises at least one longitudinal channel substantially closed at least along a distance defined between the second passage and the metering cavity.

3. The device of claim 2, further comprising at least one rib at least partially defining the longitudinal channel, wherein the pump cooperates with the rib to substantially close the longitudinal channel.

4. The device of claim 1, wherein the second passage is located adjacent the opening of the container.

5. The device of claim 1, wherein the retention element further comprises a generally tubular member, an end wall, and an open end located adjacent the opening of the container.

6. The device of claim 1, wherein the first passage is located at a first angular position, and wherein the second passage is located at a second angular position differing from the first angular position about a longitudinal axis of the retention element.

7. The device of claim 1, wherein the retention element defines two first passages located opposite each other and two second passages located opposite each other, wherein the second passages are offset ninety degrees with respect to the first passages.

8. The device of claim 1, further comprising at least one rib formed on an inner surface of the retention element and extending at least partially between the second passage and the metering cavity, wherein the rib defines the channel.

9. The device of claim 8, wherein the rib extends to an end wall of the metering cavity.

10. The device of claim 1, further comprising at least two ribs, wherein the ribs and the pump are configured to define the channel, wherein the channel is substantially closed at least between the second passage and the metering cavity, and wherein the channel is in flow communication with the metering cavity.

11. The device of claim 1, wherein the retention element is substantially cylindrical and comprises radially extending ribs.

12. The device of claim 10, wherein the pump has a lengthwise profile and the ribs have a width that varies to substantially follow the lengthwise profile of the pump between the second passage and the metering cavity.

13. The device of claim 1, further comprising a dip-tube, wherein the dip-tube is attached to the pump, and wherein one end of the dip-tube is located adjacent an end wall of the metering cavity.

14. The device of claim 1, wherein the container comprises a neck defining the opening, and wherein at least a portion of the retention element extends within the neck.

15. The device of claim 14, further comprising a collar attached to the neck, wherein the pump is attached to the collar by one of snap-fastening and rotation.

16. The device of claim 1, wherein the pump comprises a push-button device for actuating the pump.

17. The device of claim 1, further comprising product contained in the container wherein the product is a cosmetic product.

18. The device of claim 1, further comprising product contained in the container wherein the product is a hair growth product.

19. A method for dispensing a product, the method comprising:
providing the device of claim 1; and
actuating the pump to dispense product.

20. The method of claim 19, further comprising metering an amount of product to be dispensed.

21. The method of claim 20, wherein the metering comprises placing the device in the at least partially inverted orientation to flow a first amount of the product from the container into the retention element through at least one of the first and the second passages.

22. The method of claim 21, wherein the metering further comprises placing the device in the substantially upright orientation.

23. The method of claim 22, wherein the placing of the device in the substantially upright orientation causes a second amount of the product to be in the metering cavity.

24. The method of claim 23, wherein a dip-tube extends from the pump into the metering cavity and wherein the second amount of the product flows along the channel.

25. The method of claim 23, wherein a portion of the second amount of the product returns to the container through the first passage resulting in a metered amount of the product remaining in the metering cavity.

26. The method of claim 25, further comprising dispensing the metered amount of the product.

27. The method of claim 19, further comprising:
metering an amount of the product to be dispensed, wherein the metering comprises:
at least partially inverting the container to flow a first amount of the product from the container into the retention element via at least one of the first and the second passages, and
substantially uprighting the container to cause a second amount of the product to be in the metering cavity wherein the second amount of the product flows along the channel into the metering cavity, and wherein a portion of the first amount of the product returns to the container through the first passage resulting in a metered amount of the product being in the metering cavity; and dispensing the metered amount of the product.

28. The method of claim 19, wherein the product is a cosmetic product and wherein the method further comprises applying the product to at least one of skin and hair.

29. The method of claim 19, wherein the product is a hair growth product and wherein the method further comprises applying the product to hair.

30. The device of claim 1, wherein the retention element defines an open end and the at least one second passage is intermediate the open end and the axial position of the first passage.

31. The device of claim 1, wherein the retention element comprises an end wall lacking any passage such that product flow is prevented via the end wall.

32. A retention element for metering an amount of a product to be dispensed from a container, the retention element comprising:
a tubular member comprising an interior, an end wall, and an open end opposite the end wall;
at least one first passage intermediate the end wall and the open end;
a metering cavity defined between the end wall and the first passage; and at least one second passage adjacent the open end, wherein the first and second passages are configured to allow entry of a product into the interior of the tubular member via the second passage when the container is at least partially inverted, and further to allow metering of the product when the container is at least substantially uprighted resulting in a metered amount of the product being in the metering cavity while excess product is returned to the container by exiting the tubular member through the first passage, wherein the at least one second passage is located at an axial position different from an axial position of the at least one first passage.

33. The retention element of claim 32, wherein the tubular member is substantially cylindrical.

34. The retention element of claim 32, further comprising a collar adjacent the open end of the tubular member.

35. The retention element of claim 34, wherein the collar extends outward from the tubular member for engagement with the container.

36. The retention element of claim 32, further comprising at least one rib configured to at least partially define at least one channel for delivering the product to the metering cavity from the second passage to the metering cavity.

37. The retention element of claim 36, wherein the rib extends radially inward from an interior surface of the tubular member.

38. The retention element of claim 36, wherein the rib is configured to cooperate with a dip-tube to define at least one substantially closed channel for delivering the product to the metering cavity.

39. The retention element of claim 36, wherein the rib has a width dimension that varies as the ribs extend toward the end wall.

40. The retention element of claim 36, wherein the at least one rib comprises four ribs defining four channels.

41. The retention element of claim 32, wherein the at least one first passage comprises two passages.

42. The retention element of claim 41, wherein the at least one second passage comprises two passages.

43. The retention element of claim 42, wherein the first passages are located opposite each other and the second passages are located opposite each other, and wherein the second passages are offset ninety degrees with respect to the first passages.

44. The retention element of claim 32, wherein the first passage is located at a first angular position, and wherein the second passage is located at a second angular position differing from the first angular position about a longitudinal axis of the retention element.

45. A device for metered dispensing of a product, the device comprising:

a container configured to contain a product;

a pump for dispensing the product; and the retention element of claim 32.

46. The device of claim 45, further comprising a product contained in the container, wherein the product is a cosmetic product.

47. A method for metered dispensing a product, the method comprising:

providing the device of claim 45; and actuating the pump to dispense product.

48. The method of claim 47, further comprising metering the amount of product to be dispensed.

49. The method of claim 48, wherein the metering comprises at least partially inverting the container to flow a first amount of the product from the container into the retention element through at least one of the first and the second passages.

50. The method of claim 49, wherein the metering further comprises substantially uprighting the container.

51. The method of claim 50, wherein the substantially uprighting the container causes a second amount of the product to be in the metering cavity.

52. The method of claim 51, wherein a dip-tube extends from the pump into the metering cavity and wherein the second amount of the product flows along at least one channel defined at least partially by the dip-tube.

53. The method of claim 51, wherein excess product flows from the retention element via the first passage resulting in a metered amount of the product being in the metering cavity.

54. The method claim 47, further comprising:

metering an amount of the product to be dispensed, wherein the metering comprises:

at least partially inverting the container to flow a first amount of the product from the container into the retention element via at least one of the first and the second passages, and substantially uprighting the container to cause a second amount of the product to be in the metering cavity, wherein the second amount of the product flows along at least one channel into the metering cavity, and wherein a portion of the first amount of the product returns to the container through the first passage resulting in a metered amount of the product being in the metering cavity; and dispensing the metered amount of the product.

55. The method of claim 47, wherein the product is a cosmetic product and wherein the method further comprises applying the product to at least one of skin and hair.

56. The method of claim 47, wherein the product is a hair growth product and wherein the method further comprises applying the product to hair.

57. The device of claim 32, wherein the end wall lacks any passage such that product flow is prevented via the end wall.

58. A retention element for metering an amount of a product to be dispensed from a container, the retention element comprising:

a tubular member comprising an interior, an end wall, and an open end;

at least one first passage intermediate the end wall and the open end;

a metering cavity defined between the end wall and the first passage;

at least one second passage adjacent the open end; and ribs configured to cooperate with the first and second passages to allow entry of the product into the interior of the tubular element when the container is at least partially inverted, and further to allow metering of the product when the container is at least substantially uprighted resulting in a metered amount of the product being in the metering cavity while excess product is returned to the container by exiting the tubular member through the first passage.

59. The retention element of claim 58, wherein the tubular member is substantially cylindrical.

60. The retention element of claim 58, further comprising a collar adjacent the open end of the tubular member.

61. The retention element of claim 60, wherein the collar extends outward from the tubular member for engagement with the container.

62. The retention element of claim 58, wherein the ribs are configured to at least partially define at least one channel for delivering the product to the metering cavity from the second passage to the metering cavity.

63. The retention element of claim 58, wherein the ribs extend radially inward from an interior surface of the tubular member.

64. The retention element of claim 58, wherein the ribs are configured to cooperate with a dip-tube to define at least one substantially closed channel for delivering the product to the metering cavity.

65. The retention element of claim 58, wherein the ribs have a width dimension that varies as the ribs extend toward the end wall.

66. The retention element of claim 58, wherein ribs comprises four ribs defining four channels.

67. The retention element of claim 58, wherein the at least one first passage comprises two passages.

68. The retention element of claim 67, wherein the at least one second passage comprises two passages.

69. The retention element of claim 68, wherein the first passages are located opposite each other and the second passages are located opposite each other, and wherein the second passages are offset ninety degrees with respect to the first passages.

70. The retention element of claim 58, wherein the first passage is located at a first angular position, and wherein the second passage is located at a second angular position differing from the first angular position about a longitudinal axis of the retention element.

71. A device for metered dispensing of a product, the device comprising:
   a container configured to contain a product;
   a pump for dispensing the product; and
   the retention element of claim 58.

72. The device of claim 71, further comprising a product in the container, wherein the product is a cosmetic product.

73. A method for packaging and metered dispensing of a product, the method comprising:
   providing the device of claim 72; and
   actuating the pump to dispense the product.

74. The method of claim 73, further comprising metering the amount of product to be dispensed.

75. The method of claim 74, wherein the metering comprises at least partially inverting the container to flow a first amount of the product from the container into the retention element through at least one of the first and second passages.

76. The method of claim 75, wherein the metering further comprises substantially uprighting the container.

77. The method of claim 76, wherein the substantially uprighting the container causes a second amount of the product to be in the metering cavity.

78. The method of claim 77, wherein a dip-tube extends from the pump into the metering cavity and wherein the second amount of the product flows along at least one channel defined by the ribs and the dip-tube.

79. The method of claim 77, wherein excess product flows from the retention element via the first passage resulting in a metered amount of the product being in the metering cavity.

80. The method of claim 73, further comprising:
   metering an amount of the product to be dispensed, wherein the metering comprises:
      at least partially inverting the container to flow a first amount of the product from the container into the retention element via at least one of the first and the second passages, and
      substantially uprighting the container to flow a second amount of the product into the metering cavity, wherein the second amount of the product flows along at least one channel defined at least partially by the ribs, and wherein a portion of the second amount of the product returns to the container through the first passage resulting in a metered amount of the product being in the metering cavity; and dispensing the metered amount of the product.

81. The method of claim 73, wherein the product is a cosmetic product and wherein the method further comprises applying the product to at least one of skin and hair.

82. The method of claim 73, wherein the product is a hair growth product and wherein the method further comprises applying the product to hair.

83. A retention element for metering an amount of a product to be dispensed from a container, the retention element comprising:
   a tubular member comprising an interior, an end wall, and an open end opposite the end wall;
   at least one first passage intermediate the end wall and the open end;
   a metering cavity defined between the end wall and the first passage; and
   at least one second passage adjacent the open end,
   wherein the first and second passages are configured to allow entry of a product into the interior of the tubular member via the second passage when the container is at least partially inverted, and further to allow metering of the product when the container is at least substantially uprighted resulting in a metered amount of the product being in the metering cavity while excess product is returned to the container by exiting the tubular member through he first passage,
   wherein the end wall lacks any passage such that product flow is prevented via the end wall.

* * * * *

UNITED STATES PATENT AND TRADEMARK OFFICE
CERTIFICATE OF CORRECTION

PATENT NO.    : 6,601,739 B2
DATED         : August 5, 2003
INVENTOR(S)   : Frank Lacout It is certified that error appears in the above-identified patent and that said Letters Patent is hereby corrected as shown below:

<u>Column 10,</u>
Line 17, "method claim" should read -- method of claim --.

Signed and Sealed this

Seventh Day of October, 2003

JAMES E. ROGAN
*Director of the United States Patent and Trademark Office*